July 24, 1956  R. O. PETERSON  2,755,608
BUFFING TOOL
Filed Sept. 6, 1952  6 Sheets-Sheet 1

INVENTOR.
RUBEN O. PETERSON
BY
Oberlin & Limbach
ATTORNEYS.

July 24, 1956　　　　R. O. PETERSON　　　　2,755,608
BUFFING TOOL

Filed Sept. 6, 1952　　　　　　　　　　　　6 Sheets-Sheet 2

INVENTOR.
RUBEN O. PETERSON
BY
Oberlin & Limbach
ATTORNEYS.

July 24, 1956 R. O. PETERSON 2,755,608
BUFFING TOOL
Filed Sept. 6, 1952 6 Sheets-Sheet 3
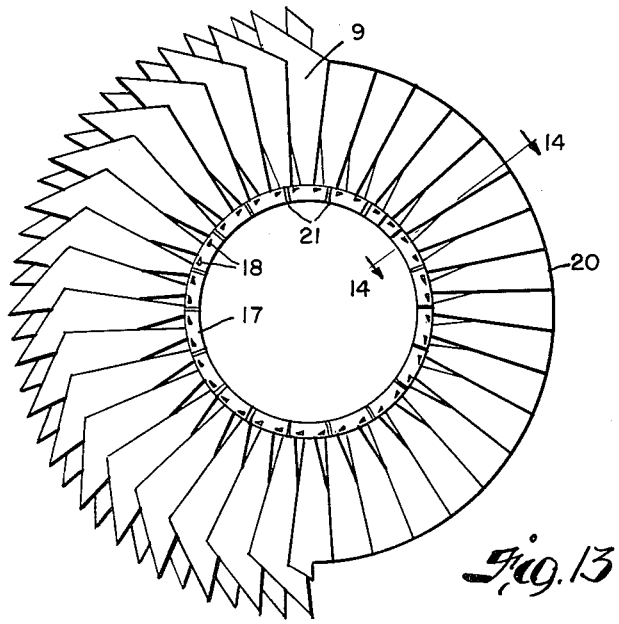
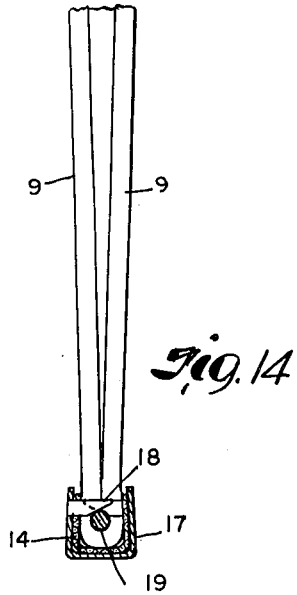
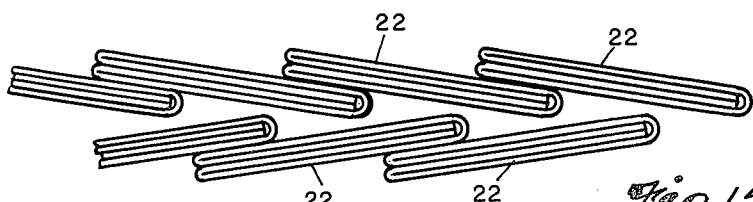
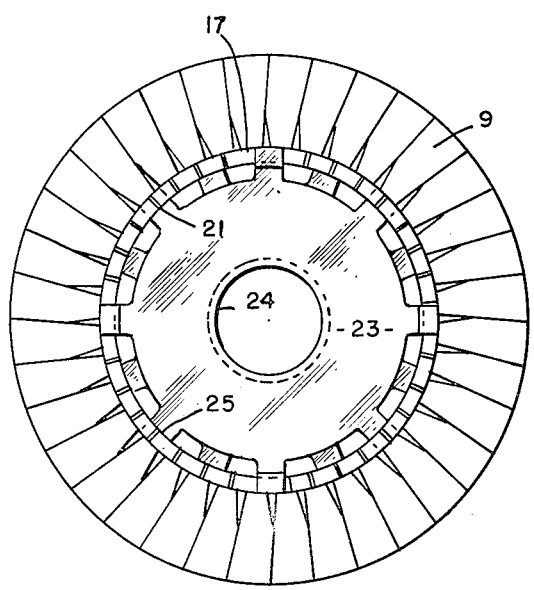
INVENTOR.
RUBEN O. PETERSON
BY
Oberlin & Limbach
ATTORNEYS.

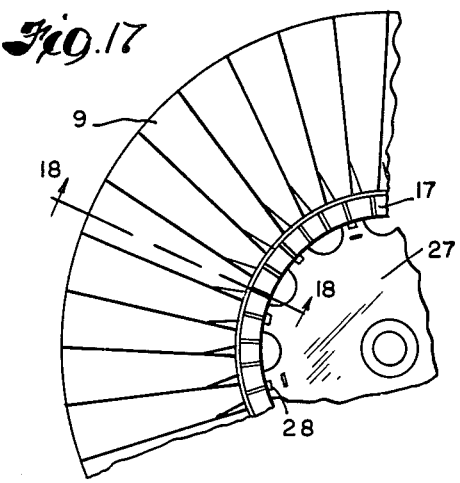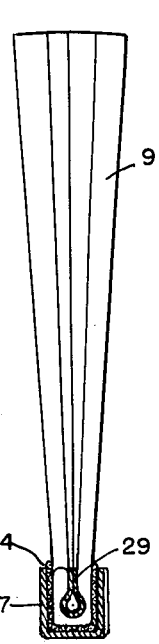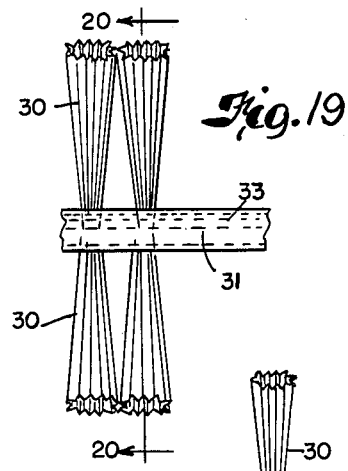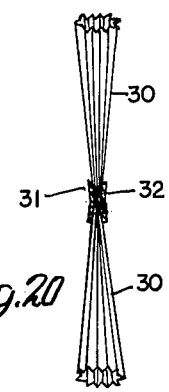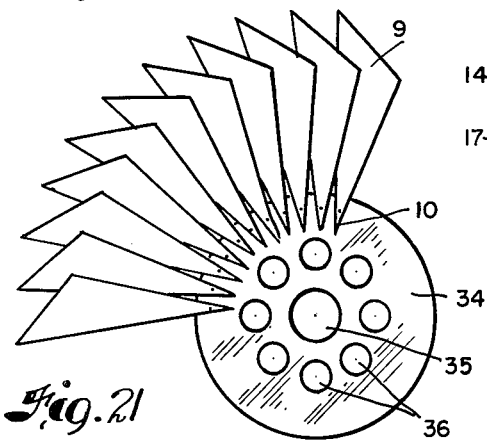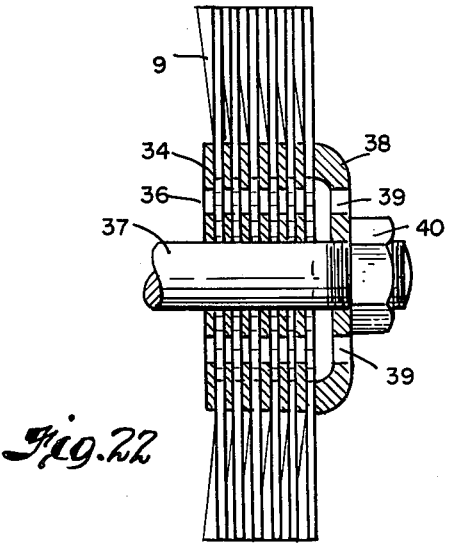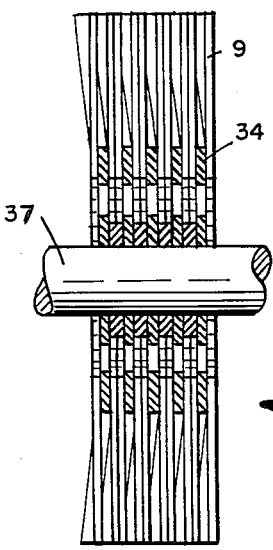

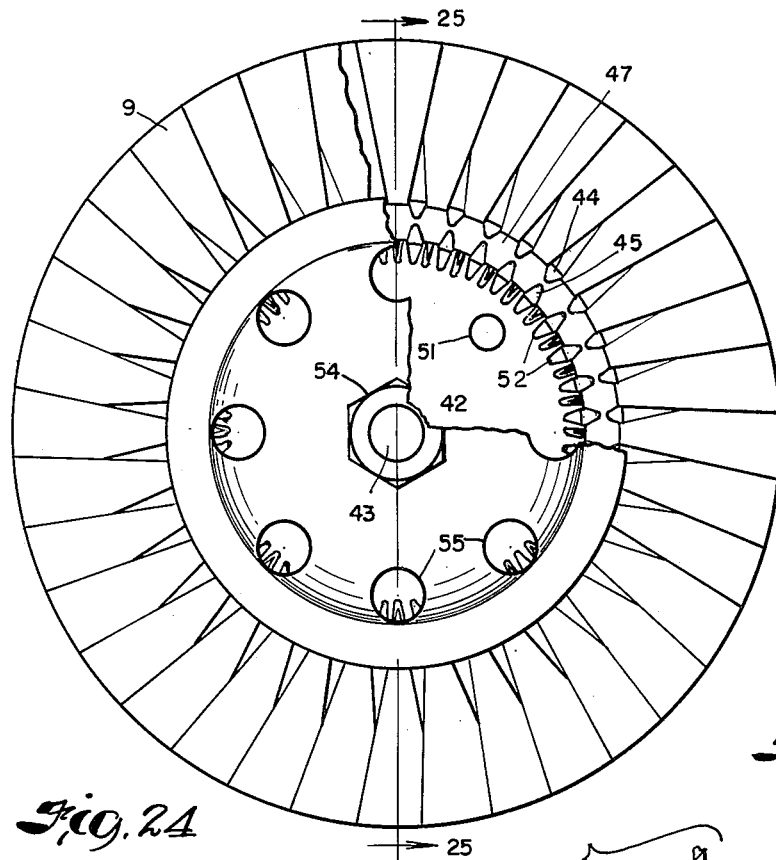
Fig. 24
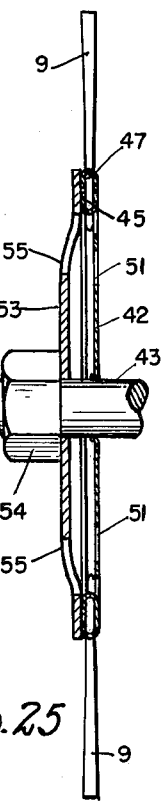
Fig. 25
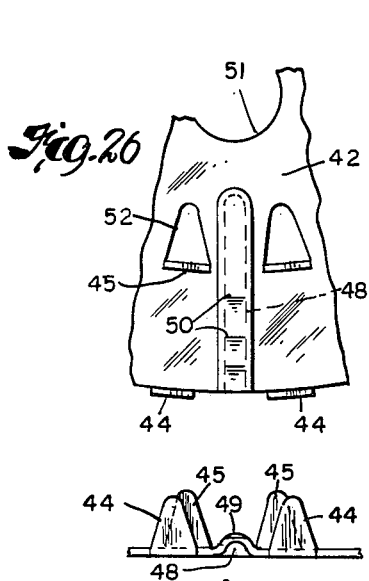
Fig. 26
Fig. 27
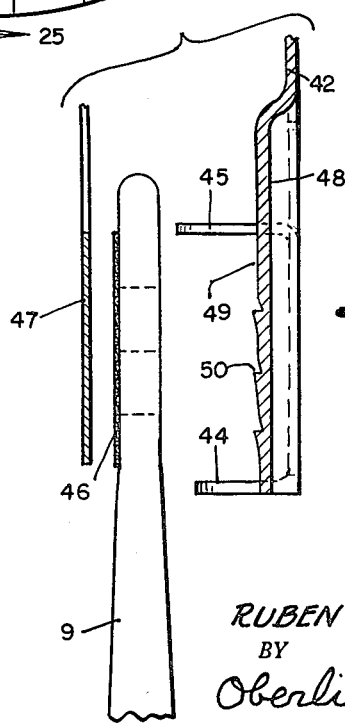
Fig. 28
INVENTOR.
RUBEN O. PETERSON
BY
Oberlin + Limbach
ATTORNEYS.

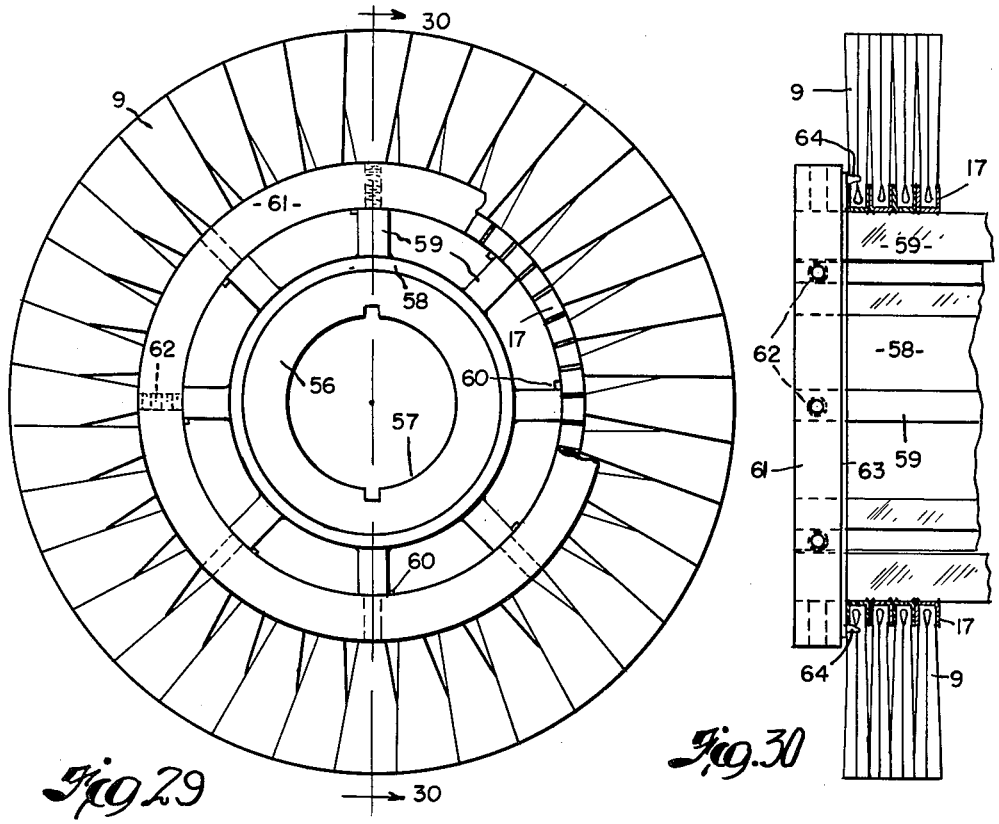

United States Patent Office 2,755,608
Patented July 24, 1956

2,755,608

BUFFING TOOL

Ruben O. Peterson, University Heights, Ohio, assignor to The Osborn Manufacturing Company, Cleveland, Ohio, a corporation of Ohio Application September 6, 1952, Serial No. 308,242

11 Claims. (Cl. 51—193)

This invention relates as indicated to a novel buffing tool and this application is a continuation-in-part of my co-pending application Serial No. 173,465, filed July 12, 1950, which issued as Patent No. 2,704,916, March 29, 1955. More particularly, this invention is concerned with rotary buffs having generally radially extending buffing fingers which may have abrasive material thereon in certain regions as more fully explained below.

Rotary buffs are employed in a wide variety of surface finishing operations and may be required either to remove a considerable amount of material from the work surface being acted upon, or to refine the finish, or to obtain a high reflectivity or gloss on such surface. Perhaps the best known form of buff merely comprises an assemblage of textile fabric discs secured together in side-by-side relationship and provided with an appropriate hub or like supporting means for mounting on an arbor. Standard abrasive and polishing materials such as emery, carborundum and rouge may be applied to the rotating buff in order that the latter may in turn apply the same to the surface to be conditioned. Certain greases, waxes, oils, glue and other adhesives may be incorporated with the abrasive or polishing material in order that the latter may be at least temporarily adhered to the working surface of the buff and not immediately thrown off and dispersed. This arrangement, of course, makes for somewhat messy working conditions and the work-piece must frequently be subsequently treated with a solvent or other cleansing agent to remove such wax, grease or oil therefrom. Inasmuch as the abrasive material is thus ordinarily intermittently applied to the rotating buff or to the work-piece, it is obvious that the surface conditioning characteristics of the latter can be far from uniform and the work-piece or work-pieces therefore non-uniformly treated.

Merely to form the buff of fabric discs having abrasive adhered to one or both sides thereof has not proven a satisfactory solution for the reason, among others, that a very rigid "wheel" results which does not have the resilience and soft yielding action frequently desired in a buff. It is this yielding action which permits a buff to be forced against a work-piece without danger to the latter or to the buff but at the same time obtaining desired penetration into hollows and conformance to irregular contours of the article being buffed.

In most buffs now currently employed in industry, an undesirably large proportion of the buff material is contained in that portion of the buff adjacent the inner periphery of the same. Indeed, in an attempt to obtain a desirable density of buff material at the outer working periphery of the buff, it is common practice to compact such buff material to the extent possible about the inner periphery of the latter. As a result, a large proportion of the relatively expensive buff material may be concentrated adjacent the inner periphery where it will never serve a useful purpose and will be entirely wasted, while at the same time effectively preventing ventilation of the buff in use and so ensuring overheating of the same.

Overheating may become a very serious problem and result in charring of the fabric, the latter sometimes actually catching fire. These problems are, of course, further exaggerated when abrasive coated fabric is utilized, such abrasive both adding to the bulk of the buff material and also tending to generate additional heat through frictional interaction of adjacent layers of fabric material.

It is accordingly a principal object of my invention to provide a novel buff construction utilizing fabric having abrasive material adhered thereto but which will retain substantially all of the normally desired characteristics of the usual untreated buff.

It is a further object to provide an abrasive buff which will be flexible and adapted to conform to the contours of a work-piece being acted upon.

Still another object is to provide a buff in which a very large proportion of the material, both fabric and abrasive, will be concentrated adjacent the outer periphery of the buff rather than adjacent the inner periphery of the same.

A further object is to provide a novel buff and method of assembling the same whereby such buff may be manufactured in a series of substantially continuous operations suitable for performance on brush-making machines already well known in the art.

Still a further object is to provide a rotary buffing tool having a buffing finger assembly and mounting means therefor adapted to cooperate forcibly to draw a strong current of cooling air through the inner portion of the tool to precent overheating in use.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Figs. 1–5 inclusive illustrate one preferred manner of folding a sheet of buff material to form a buffing finger adapted to be assembled with other such fingers into a novel type of rotary buff;

Figure 5:
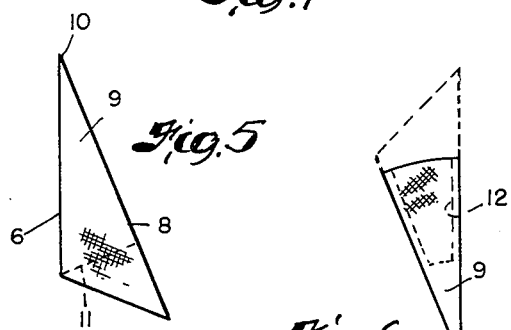
Figure 6:
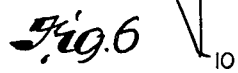
Fig. 6 illustrates a buffing finger generally similar to that of Fig. 5 but trimmed to proper size and indicating the preferred region where abrasive may desirably be adhered to such finger.
Figure 7:
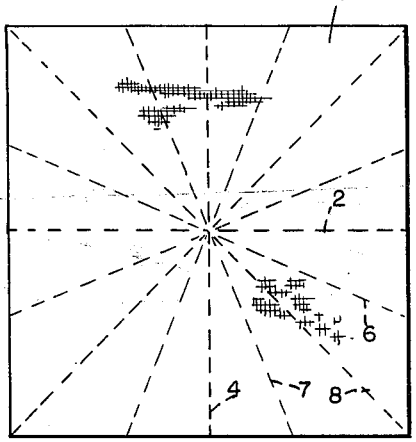
Fig. 7 illustrates the various folds required to transform the sheet of Fig. 1 to the buffing finger of Fig. 5.
Figure 8:
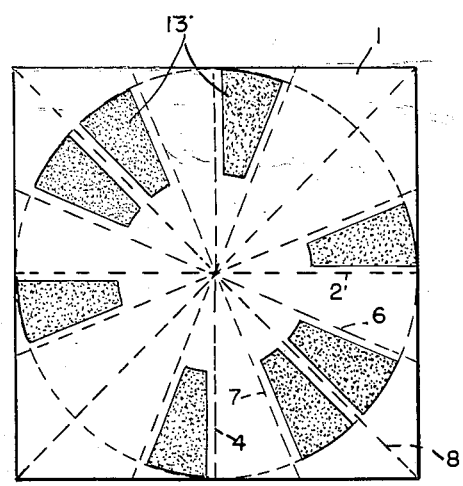

Fig. 8 resembles Fig. 7 but shows the regions to which abrasive material may preferably be adhered so that when the sheet is folded to Fig. 5 form, no two abrasive areas will contact one another and the outer lateral surfaces of the buffing finger will not be abrasive coated;

Figs. 9–12 inclusive illustrate a preferred method of assembling such fingers of the Fig. 5 or Fig. 6 type into the finished article such as buff strip;

Fig. 13 shows a length of such buff strip circularized to helical form and partially trimmed to form a rotary buff;

Fig. 14 is a transverse sectional view on an enlarged scale taken on the line 14—14 on Fig. 13;

Fig. 15 is a semi-diagrammatic view showing the arrangement of the outer ends of such buffing fingers;

Fig. 16 shows a circularized length of buff strip in accordance with my invention mounted upon an appropriate ventilating adapter;

Fig. 17 is a fragmentary view similar to Fig. 16 but showing an annular buffing section formed in the general manner illustrated and described in Whittle Patent No.

Figure 9:
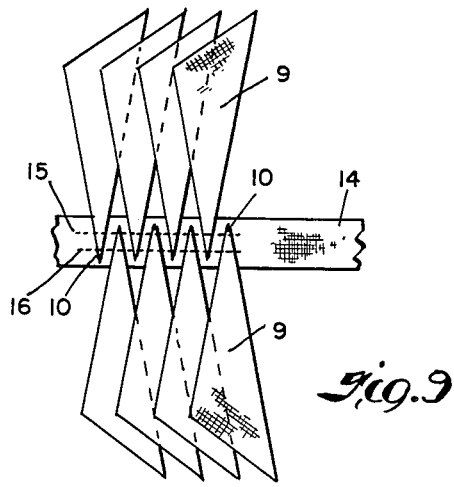

2,288,337 and mounted on a different type of adapter;

Fig. 18 is a transverse sectional view taken on the line 18—18 on Fig. 17;

Fig. 19 is a detail view showing oppositely extending buffing fingers of a type similar to that disclosed and claimed in my co-pending application Serial No. 81,985 filed March 17, 1949, but secured to a continuous central strip in a manner generally similar to that shown in Fig. 9;

Fig. 20 is a transverse view taken on the line 20—20 on Fig. 19;

Fig. 21 illustrates the manner in which buffing fingers of the Fig. 5 and Fig. 6 type, for example, may be secured to a cardboard hub or adapter, for example;

Figs. 22 and 23 illustrate two forms of annular buff elements of the Fig. 21 type mounted upon rotatable shafts or arbors;

Fig. 24 illustrates still another form of ventilated rotary buff utilizing novel means for securing the buffing fingers;

Fig. 25 is a transverse sectional view taken on the line 25—25 on Fig. 24;

Fig. 26 is an enlarged fragmentary detail view of a portion of one of the adapter elements;

Fig. 27 is a fragmentary detail view corresponding to Fig. 26 but in a plane normal thereto;

Fig. 28 is a fragmentary semi-diagrammatic drawing illustrating the manner of assembling the several elements of the Fig. 24 buff;

Fig. 29 is an end view of still another form of mounting means for new rotary buff; and Fig. 30 is a longitudinal sectional view taken on the line 30—30 on Fig. 29.

Figure 1:
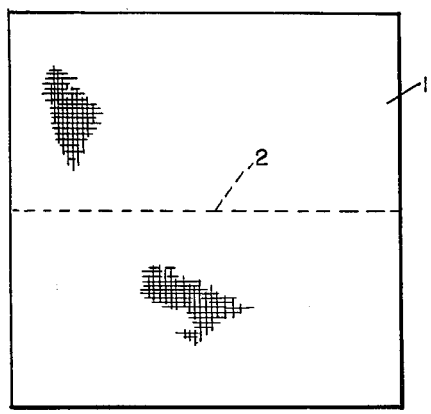
Figure 2:
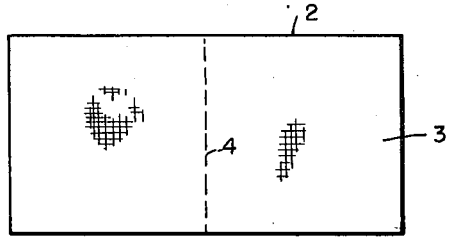
Figures 3, 4:
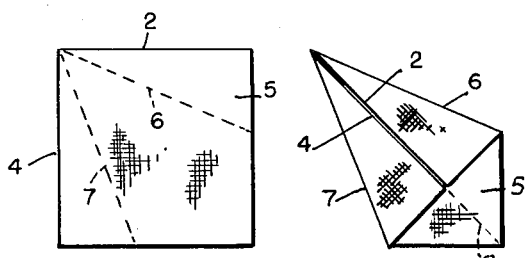

Referring now more particularly to the annexed drawing and especially Figs. 1–8 thereof, one method of producing a preferred form of buff finger for employment in accordance with my invention is there illustrated. A square sheet of buff material 1, such as cotton fabric for example, is folded along a line 2 parallel to and midway between two edges of the sheet to form an elongated rectangle 3. Such rectangle is then again folded along a line 4 parallel to and midway between the two farthest spaced sides of such rectangle to form a square 5 which will be one-fourth the size of the original square 1. Such square 5 is then folded along two lines 6 and 7 extending from the corner representing the juncture of folds 2 and 4 to points on the respective opposite sides of such square, the edges defined by such folds 2 and 4 meeting along a diagonal of such square 5 as shown in Fig. 4. The resultant polygon is then folded along such diagonal line 8 to form the triangular finger 9 (Fig. 5).

As may be seen by a comparison of Figs. 4 and 5, the material comprising such finger 9 is of uniform thickness from the narrow tip end 10 to line 11, the remaining material beyond such latter line comprising fewer layers. The end portion of finger 9 opposite to narrow tip end 10 will accordingly ordinarily be trimmed away as shown in Fig. 6 since such fingers will ordinarily be arranged in a radially extending manner to form rotary buff elements.

In one embodiment of my invention, granular abrasive materials such as emery or carborundum, for example, may be adhered to certain areas of the buff fabric so that the finished finger 9 will have an abrasive portion in a region 12 substantially removed from the narrow pointed end portion 10. The wider outer end portion of the finger 9 will thus also be appreciably thicker than such pointed inner end portion. Figure 7 illustrates the lines of folding of original square 1 of buff fabric in forming the finger of Fig. 5 as above explained. It is desirable that when areas of abrasive are adhered to such fabric to form the abrasive region 12, such abrasive areas be located in a manner to avoid opposing one such area to another when the fabric is folded. Now referring more particularly to Fig. 8 of the drawing, it will be seen that the abrasive areas such as 13 may be located between the indicated lines of folding and offset to avoid juxtaposition of one such area to another when the sheet of buff fabric is thus folded. Moreover, such abrasive areas will desirably be slightly spaced from from the indicated lines of folding to facilitate such folding operations. Inasmuch as the abrasive areas 13 are all on one side of sheet 1 in the embodiment illustrated, it will readily be apparent that the folded finger 9 will have no abrasive on its two exposed outer faces. This is ordinarily a desirable feature since, in the finished buff, the fingers are free to move somewhat relative to one another and opposed abrasive outer surfaces would rub together, generating heat and shedding abrasive to no useful purpose. Figure 8 also illustrates the manner in which such abrasive areas are spaced a very considerable distance, preferably one-fourth to one-half the length of the finished finger, from the center of sheet 1 which eventually forms pointed inner end 10 of such finger. This means that the relatively narrow inner end portions of such fingers will be flexible to an appreciable degree and also capable of yielding inwardly by buckling slightly under pressure, as when the face of the buffing tool may be pressed forcibly against the work. Since the bulk of the fabric as well as of the abrasive will be located in the wider outer end portion of the finger, such fingers lend themselves very advantageously to the construction of rotary buffing tools wherein the narrow inner ends 10 are secured to a central hub or support and the fingers extend generally radially therefrom. Such relatively thick outer end portions may thus form a relatively dense buff face even when the inner ends 10 are spaced somewhat apart about the periphery of such hub or support to afford ventilating passages therebetween.

Figure 11:
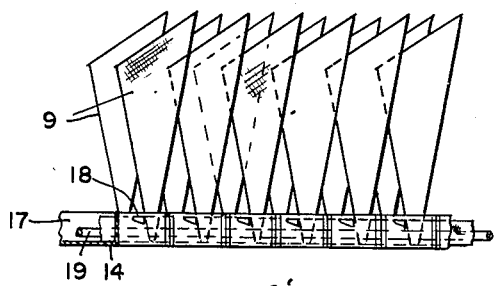

Referring now more especially to Figs. 9–12 inclusive of the drawing, a plurality of such tapered fabric fingers 9, with or without abrasive regions 12, may be arranged in two oppositely extending overlapping rows as shown in Fig. 9 with their narrow end portions 10 lying upon a continuous fabric strip 14 which may be of cotton textile material, for example. Such fingers may be attached to the strip 14 as by a plurality of rows stitching 15 and 16. Of course, many other types of attaching means such as adhesive, staples, etc., may be employed as desired. Such fabric strip 14 may be placed in longitudinally extending relationship upon an elongated flat metal strip 17 having upstanding teeth such as 18 punched therein and such strip shaped to channel form in the manner described in my Patent No. 2,303,386. A wire 19 or other equivalent elongated retaining element may desirably be placed upon the superimposed strips 14 and 17 to be held beneath teeth 18 when strip 17 is shaped to channel form and thereby more securely to retain strip 14 and the fingers 9 within such channel. Of course, since the inner ends 10 of fingers 9 overlap somewhat upon strip 14, such wire will likewise overlie the fingers themselves, affording a very secure anchor and assembly. As best shown in Fig. 11, the originally oppositely extending fingers 9 will now have been brought into substantial parallelism. Due to the spacing of the inner ends 10 of such fingers, substantial ventilating passages are provided therebetween although the wider outer end portions of the fingers will overlap to a substantial degree.

Buff strip produced as above described may be circularized to form a single turn or a helix as shown in Fig. 13. The generally radially extending fingers 9 will ordinarily be trimmed either prior to or subsequent to circularization of the buff strip to form a uniform outer face 20. The sides of the sheet metal channelform back 17 may desirably be indented to form a plurality of radially extending grooves such as 21 which will facilitate outward flow of ventilating air to the passages between the inner end portions of the buffing fingers.

Inasmuch as the outer end portions 22 of fingers 9 will ordinarily be in overlapping relationship even after circularization of the buff strip (Fig. 15), it will be apparent that no streaking of the work will result when contacted with the rotating buffing tool in contrast to the streaking which often occurs when employing the usual form of buff comprising a compacted assembly of parallel layers of fabric. The staggered offset relationship of the buffing finger ends has a further advantage in that pockets are formed therebetween which assist in retaining any abrasive which may be supplied thereto during the buffing operation. The angular or slightly twisted form of the fingers 9 is of further advantage in affording an effect not unlike that of the blades or vanes of a ventilating fan. The rapidly rotating buff is accordingly effective to draw in a flow of air internally of the tool and to expel such air generally radially with an attendant cooling and ventilating effect which permits the employment of abrasive and high speed operation without danger of damage to the tool or work.

Such ventilating effect may be considerably enhanced by employment of suitable adapters for mounting the circularized buff elements in the general manner disclosed, for example, in my prior Patents Nos. 2,316,185, 2,320,384 and 2,409,309. Thus, for example, referring to Fig. 16 of the drawing, an adapter comprising an annular sheet metal disc 23 having a central inner opening 24 adapted to be mounted upon an appropriate arbor or shaft is provided with radially outwardly extending arms such as 25 and 26 alternately oppositely axially offset to embrace opposite sides of one or more annular buff sections. Passages for the circulation of air are accordingly left between the outer peripheries of such adapters and the inner peripheries of the circularized channelform sheet metal backs 17 within which the buffing fingers 9 are retained.

Figure 17 illustrates another embodiment of the general type shown and described in my prior Patent No. 2,409,309 where the annular adapter 27 may comprise a sheet of indurated fiber board having a notched periphery leaving a plurality of radially extending lug portions 28 upon which the inner periphery of the circularized back 17 may be seated and to which it may be secured as by means of small tongues struck up from the bottom of the sheet metal channelform back 17.

Instead of securing the buffing finger assembly of Fig. 9 within a continuous sheet metal channel produced in accordance with my Patent No. 2,303,386 as above described, a length of the Fig. 9 assembly may be circularized and secured within an annular channelform back in the manner taught in Patent No. 2,288,337 to W. S. Whittle. In such embodiment the strip 14 is secured within the annular sheet metal channelform back 17 by means of an inner deformed channel member 29, and no wire retaining element need be employed. It will, of course, be understood that such methods of assembling my novel buff material into appropriate backs or other supporting means are given merely by way of illustration of the adaptability of such material for handling in a manner generally similar to that in which conventional stranded brush material may be handled.

Instead of folding the individual buffing fingers in the manner described above, they may instead be formed as taught in my co-pending application Serial No. 81,985 filed March 17, 1949, which issued as Patent No. 2,658,315, November 10, 1953, from a plurality of fabric discs, such discs being folded or pleated with the center of the disc forming the narrow pointed end of the resultant generally tubular buffing fingers 30. Such fingers may be formed in pairs as taught in my aforesaid application Serial No. 81,985, now Patent 2,658,315, and such pairs stitched or otherwise secured adjacent the points of joining of the inner ends of the fingers to continuous fabric strips 31 and 32 as by stitching 33, for example. They may then be handled in the same general manner previously described in the formation of continuous lengths of buff strip or mounted in annular backs of the Whittle type. By securing such buffing fingers 30 to a continuous strip or strips such as 31 and 32, the material is adapted to automatic methods of continuous assembly into the back or other supporting element and proper uniform spacing of the buffing fingers is assured. Relatively narrow longitudinally extending stripes of abrasive may be adhered to the fabric discs in a manner generally comparable to that illustrated in Fig. 8, with the corresponding folding or pleating of the fabric taking place between such stripes. The stripes should, moreover, be well spaced from the inner end portions of the respective fingers as previously explained, and ordinarily such stripes will be on one side of the fabric only, namely that side which is to form the interior surface of the tubular pleated finger. It is, of course, not essential that the fabric from which fingers 30 are formed be cut to disc form preliminarily to formation of the finger, and squares of fabric may be utilized in a similar manner. Any trimming of the buffing tool which may be desired will ordinarily be done after final assembly into an annular or cylindrical tool.

Figures 21–23 illustrate yet another simple manner of utilizing the buffing fingers such as 9 to form a ventilated rotary buffing tool. A plurality of such radially extending fingers may be stapled or adhered to an annular fiber disc 34 having a central opening 35 for mounting upon a shaft or arbor and a plurality of holes 36 therethrough intermediate such central opening and the inner ends 10 of the buffing fingers 9. It will, of course, be appreciated that such buffing fingers will extend uniformly from the entire periphery of the disc 34, a portion only of such fingers being illustrated in Fig. 21. When a plurality of buffing sections thus produced are mounted upon a shaft 37 as shown in Fig. 22, it will be seen that the inner ends of the buffing fingers serve to space the discs 34 apart to permit radially outward passage of ventilating air which is adapted to enter through axially aligned openings 36. A clamping end plate 38 having openings 39 therein corresponding to openings 36 in the discs 34 will desirably be employed and secured as by means of a nut 40 on shaft 37. Since such annular clamping end plate 38 will preferably be dimensioned to engage the annular buffing elements in a region adjacent the outer periphery of the discs 34, it is clear that the clamping pressure will be brought forcibly to bear upon the inner end portions 10 of the buffing fingers further to secure such fingers against detachment. Of course, a comparable end plate (not shown) will be employed at the other end of the buff assembly on shaft 37.

A modification of the Fig. 22 assembly is shown in Fig. 23 where the buffing fingers are secured to both sides of each disc 34 so that when a plurality of such discs are assembled upon shaft 37, double layers of such fingers will result. With this arrangement it is desirable to provide spacer rings or washers 41 intermediate the adjacent discs 34. Obviously, the last-described embodiment will afford a somewhat more dense buff face at the working surface of the tool than will the Fig. 22 embodiment.

Now referring to Figs. 24–28 inclusive of the drawing, a further embodiment of my invention is illustrated utilizing novel means for securing the tapered buffing fingers to a disc. Such tapered buffing fingers 9 are secured to a fabric strip 14 and such fingers folded along the longitudinal center line of such strip so that such fingers extend side-by-side in the same direction. Such strip or tape is then superimposed upon a disc 42 having a central opening for mounting upon a shaft 43 and teeth 44 and 45 turned up from its outer periphery and a region slightly inwardly spaced from such periphery respectively to clamp and grip the fabric strip 14 from which fingers 9 extend. More particularly, in the illustrated embodiment a single row of the fingers 9 may be stitched or adhered to a fabric strip or tape 46 and a thin sheet metal ring 47 placed thereon so that when teeth 44 and 45 are bent over to embrace and grip strip 46, they will also enclose annulus 47, considerably enhancing the gripping action on such fabric. Radially extending grooves 48 may desirably be indented in the peripheral portion of the sheet metal disc 42 intermediate the teeth thereon to ensure outward flow of air between adjacent discs. The resultant ridge 49 may be provided with serrations such as 50 which assist in gripping the buffing fingers 9 when clamping the latter. Discs 42 are formed with a plurality of openings 51 therethrough radially inwardly of such teeth 45 to permit passage of air axially within the assemblage, this being supplemented by the openings 52 formed by the punching up of teeth 45. Clamping end plate 53 will have a diameter approximately equal to that of discs 42 and may desirably be cupped as shown in Fig. 25 so that when secured in place as by means of nut 54, heavy clamping pressure may be exerted in the region of the buffing finger inner ends to assist in securing the same. A plurality of ventilating openings 55 permit access of cooling air to the interior of the assembly for passage through openings 51 and radially outward escape through grooves 48 leading to the air spaces or passages intermediate the inner portions of the buffing fingers. A continuous cooling effect is thus obtained which is of great importance in high speed operation. As in the case of the other ventilated constructions described above, other ventilated constructions described above, other cooling fluid such as water may be introduced under certain circumstances, if desired. The buffing fingers act much as fan blades to move the air or other fluid and throw it outwardly through centrifugal action. This outward displacement of the air serves to suck new air in through the adapter and clamping plate openings.

In some large operations, it is more economical to mount buff sections directly upon a specialized core fitting over the usual shaft than it is to discard adapters when the buff elements mounted thereon have become worn. In Figs. 29 and 30 of the drawing, I disclose a core comprising one or more bushings 56 having an arbor hole 57 adapted to fit a corresponding shaft to which it may be keyed. A tube 58 is mounted on such bushings 56, and a plurality of longitudinally extending ribs or fins 59 are welded to the outer surface thereof. Small protuberances such as 60 may be struck up from the underside of buff strip sheet metal channel 17 adapted to engage such ribs 59 to prevent slipping of the circularized strip when mounted on the core as shown. End collars such as 61 may likewise be mounted on ribs or fins 59 and secured as by means of screws 62 to keep the annular buff sections from shifting axially of the core. Balancing plugs may also be screwed into the screw holes in such end rings. If helical buff strip is employed instead of annular sections of the Whittle type, the ring 61 may be sawed through at one spot its perimeter and the two ends displaced the thickness of one turn of the buff back to afford a helical ramp fitting the end turn of the helical coil of buff strip. Such ends of the split ring 61 may be welded or otherwise secured in such displaced position. In Fig. 30 a toothed ring 63 is shown, the teeth 64 of which are adapted to project inwardly and closely overlie the lip or edge of the sheet metal channelform back of the final turn of buff strip. This is not of such great importance when annular sections of the Whittle type are employed but is very desirable when helically coiled strip is used.

Typical examples of suitable granular abrasives for use in accordance with my invention include:

Aluminum oxide ("Alundum," "Aloxite," "Corundum")
Silicon carbide ("Carborundum")
Chrome oxide
Natural abrasives (e. g. pumice, emery)
Mixtures of the above The aluminum oxides are particularly suitable where good abrasive action combined with the production of a relatively good finish is desired.

The silicon carbides make hard and sharp abrasives for maximum cutting action.

Chrome oxide is employed to give a finish on stainless steel and similar materials.

While many types of adhesives may be employed to secure the abrasive to the buff fabric, depending on the particular application, the following may be mentioned: animal glues, glycerol phthalate resins such as "Dulux," Bakelite resins, cellulose base resins, casein glue, and even waxes such as cerotic acid wax and greases such as mutton tallow. Ordinarily adhesives are preferred which have relatively little stiffening effect on the fabric and do not tend to smear the work, or at least may be readily removed from such work. The adhesive should not be too brittle but should stand up under impact in use. When synthetic plastic sheet material is employed as the buff fabric, the abrasive may be adhered by pressing into the plastic surface, with application of heat or solvent where appropriate to bond the abrasive grains thereto.

Adhesive will desirably be printed on the fabric by the well-known roller process and the abrasive then dusted thereon. In this manner, the abrasive will be secured only to the precise areas desired and all excess is readily blown away. If desired, however, the abrasive and adhesive can be applied together.

Among abrasive materials suitable for different operations are: aluminum oxides such as Alundum and Aloxite, silicon carbide (Carborundum), precipitated aluminum oxide, emery, rouge, pumice, Tripoli, sharp sand, bauxite, and diatomaceous earth. Fabric having abrasive areas may also be provided by interweaving abrasive strands which may be of the type taught in Radford Patent No. 2,328,998, for example.

Since the abrasive stripes preferably do not extend radially inwardly to the inner periphery of my new rotary buffs, not only do I obtain improved ventilation with proper density at the working surface (despite radial spreading) but also the buff "fingers" are attached by relatively flexible means to the back or the like. The resultant rotary surface-conditioning tool preserves the desirable attributes of the buff, with a much enhanced abrasive action.

It will be seen from the foregoing that I have provided a type of abrasive buff construction which is both flexible and cool in operation and which is particularly adapted for machine manufacture. In other words, the buff material may be preassembled in a manner facilitating its incorporation within a metal channelform back, for example, in the general manner described in my prior Patent No. 2,303,386. The greater part of both the buff fabric and abrasive is concentrated toward the outer periphery of the buffing tool where it will be of use, and also providing the desired density of material in this region. The various radially extending folds and pleats do not expose cut fabric edges so that raveling and premature dissolution of the buff fabric is substantially eliminated.

While the buff strip of my invention may commonly be circularized to form a helix or single turn annulus with the buff material extending generally radially therefrom, straight lengths of my new buff strip may also be employed arranged parallel to the arbor on which they are supported or in long lead helical form. Buffs and brushes of this general conformation are, of course, already known in the art. Likewise, a length of buff strip may be circularized with the buff material extending in a generally axial direction rather than radially to form a cup-shaped buffing tool. This general type of construction is also well known.

The term "fabric" as employed herein and in the claims is intended to include any suitable sheet material whether textile or imperforate plastic sheet, for example. Thus, cotton cloth, nylon (polyamide resins), Pliofilm (rubber hydrochloride), or certain types of paper sheet material are entirely suitable for use in embodiments of my invention for certain purposes, and other natural or manufactured fiber materials may likewise be employed.

The abrasive areas will ordinarily be flat and not project substantially above the surface of the sheets to which they are applied. While such abrasive areas will ordinarily be in the form of stripes with uncoated regions therebetween to facilitate folding or pleating of the sheet material such abrasive areas should nevertheless desirably be somewhat flexible and not too stiff and brittle. Abrasive may be adhered to both sides of the sheets but will preferably not be exposed on the outer sides of the completed buffing fingers.

Figure 10:
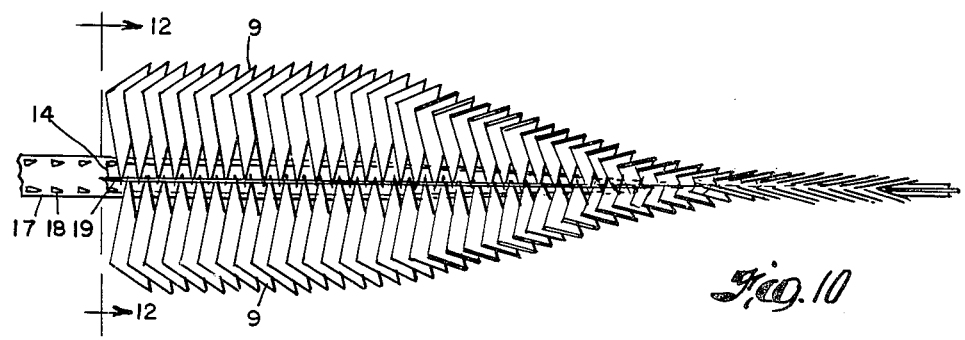
Figure 12:
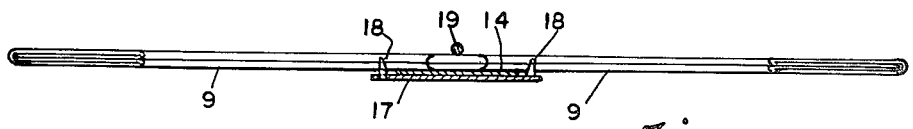

As shown in the drawing, my flexible buffing fingers will ordinarily be considerably longer than their width at their widest point (the outer ends) and such outer wider end portions will comprise a greater quantity of buffing material than the corresponding inner end portions, whereby a relatively dense working face is provided for the buff. Their flexibility permits considerable inward yielding action in use and relative movement between the respective fingers. The preliminary attaching of the narrow ends of such fingers to a flexible strip as in Fig. 9 not only facilitates continuous feeding of the material to a forming machine to produce buff strip as shown in Fig. 10 but also serves to keep the inner ends of the fingers spaced apart at desired intervals. The strip 14 or 46 (Figs. 24–28), for example, may likewise be utilized to assist in securing the fingers on other types of supports.

Certain subject-matter disclosed but not claimed herein is disclosed and claimed in my co-pending application Serial No. 456,846, "Rotary Tool Assembly," filed September 17, 1954.

Other modes of applying the principle of the invention may be employed, change being made as regards the details described, provided the features stated in any of the following claims or the equivalent of such be employed.

I therefore particularly point out and distinctly claim as my invention:

1. The method of producing a rotary abrasive buff which comprises adhering abrasive to selected spaced regions of squares of buff fabric, folding such squares along a center line midway between two opposite sides, folding the resultant rectangles along a line midway between the farthest spaced opposite sides of the same to form squares one-quarter the size of the original squares having folds down two adjacent side edges, turning in such two adjacent edges with the same meeting along a diagonal of such latter squares, folding the resultant quadrilaterals along such diagonal with such turned-in portions inside to produce triangular buffing fingers having two long sides extending from a point defining the corner between the adjacent folded edges of such small squares, such abrasive regions lying in the areas intermediate the folds only and spaced from such point, stitching such fingers in staggered oppositely extending series to a narrow continuous fabric strip with the end portions including such points overlying such strip, superimposing such fabric strip on a continuous metal strip having rows of teeth adjacent its respective edges projecting toward such fabric strip, placing a wire retaining member along the longitudinal center line of such superimposed strips intermediate such rows of teeth, forming such metal strip to channel form with such rows of teeth penetrating such fabric to overlie such wire and bringing such oppositely extending fingers into close side-by-side relationship, circularizing the resultant buff strip with such fingers extending radially, and trimming the ends of such fingers to generally circular contour.

2. The method of producing a rotary abrasive buff which comprises adhering abrasive to selected spaced regions of squares of buff fabric, folding such squares along a center line midway between two opposite sides, folding the resultant rectangles along a line midway between the farthest spaced opposite sides of the same to form squares one-quarter the size of the original squares having folds down two adjacent side edges, turning in such two adjacent edges with the same meeting along a diagonal of such latter squares, folding the resultant quadrilaterals along such diagonal with such turned-in portions inside to produce triangular buffing fingers having two long sides extending from a point defining the corner between the adjacent folded edges of such small squares, such abrasive regions lying in the areas intermediate the folds only and spaced from such point, securing such fingers in oppositely extending series to a narrow continuous fabric strip with the portions including such points overlying such strip, securing such strip within a metal channelform back with such fingers extending in side-by-side relationship therefrom, circularizing the resultant buff strip with such fingers extending radially, and trimming the ends of such fingers to generally circular contour closely adjacent the radially outer edges of such abrasive regions.

3. The method of producing a rotary abrasive buff which comprises adhering abrasive to selected spaced regions of squares of buff fabric, folding such squares along lines intermediate such abrasive regions only to form elongated flat triangular buffing fingers, securing such fingers in two oppositely extending rows to a continuous elongated flexible strip, and circularizing such strip with such rows of fingers brought into close side-by-side relationship.

4. The method of producing an abrasive buff strip which comprises adhering abrasive to selected regions of fabric pieces, folding such fabric along lines intermediate such abrasive regions only to form generally triangular buffing fingers, securing pointed end portions of such fingers to an elongated strip of flexible material with such fingers extending therefrom in two oppositely extending rows, and circularizing such strip with such rows of fingers brought into close side-by-side relationship.

5. The method of producing an abrasive buff strip which comprises adhering abrasive to selected regions of fabric pieces, folding such fabric along lines intermediate such abrasive regions only to form generally flat triangular buffing fingers, and securing pointed end portions of such fingers to a supporting back.

6. A rotary abrasive buff comprising an annular metal channelform back, a flexible fabric strip extending longitudinally within such channel, generally flat triangular folded fabric fingers secured in pointed end regions to said strip and extending in two side-by-side rows therefrom, said fingers having abrasive regions intermediate their lines of folding only, a wire retaining element within such channel overlying said strip and finger end regions in between such rows, and teeth punched in from said channel back overlying and securing said wire.

7. A rotary abrasive buff comprising a channelform back, a continuous elongated strip of flexible material secured within such channel, and flexible generally triangular folded sheet material fingers secured in pointed end regions to said strip, said fingers having abrasive regions intermediate their lines of folding only.

8. A rotary abrasive buff comprising an annular channelform back the channel of which opens generally radially outwardly, a continuous elongated strip of flexible material secured within such channel, and flexible generally triangular folded sheet material fingers secured in pointed end regions to said strip, such sheet material having abrasive areas not including such pointed end regions but extending to the other ends of said fingers.

9. A rotary buff comprising an annular metal channelform back, a flexible fabric strip extending longitudinally within such channel, generally flat folded fabric buffing fingers tapering to a point, the edges of said fingers extending from such points exposing only folds of such fabric and said fingers being joined to said fabric strip in the region of such points in two side-by-side rows, a wire retaining member within such channel overlying said strip and pointed finger end regions in between such rows, and teeth punched in from said channel back overlying and securing said wire.

10. A buff element comprising a channelform back, generally flat folded sheet material buffing fingers tapering to a point, the end portions of said fingers including such points lying within said channelform back and extending transversely thereof, and an elongated retaining member extending longitudinally within such channel overlying said transversely extending end portions and securing the same.

11. As a new article of manufacture, a rotary tool comprising a plurality of flat tapering fingers of folded sheet material secured to a rotatable support, each of said fingers having a pointed inner end by which it is secured to said rotatable support, and said pointed inner end being in the central region of a substantially circular portion of said folded sheet material, and said circular portion of said folded sheet material having radially disposed areas coated with abrasive material spaced a substantial distance outwardly from said point.

References Cited in the file of this patent

UNITED STATES PATENTS

| Number | Name | Date |
|---|---|---|
| 981,841 | Codman et al. | Jan. 17, 1911 |
| 1,635,350 | Simons | July 12, 1927 |
| 1,657,784 | Bergstrom | Jan. 31, 1928 |
| 2,027,425 | Hall | Jan. 14, 1936 |
| 2,056,716 | Doyle | Oct. 6, 1936 |
| 2,124,114 | L'Hommedieu | July 19, 1938 |
| 2,136,747 | Levoy | Nov. 15, 1938 |
| 2,140,208 | Murray | Dec. 13, 1938 |
| 2,146,284 | Churchill | Feb. 7, 1939 |
| 2,198,282 | Hall | Apr. 23, 1940 |
| 2,226,625 | MacFarland | Dec. 31, 1940 |
| 2,288,337 | Whittle | June 30, 1942 |
| 2,303,386 | Peterson | Dec. 1, 1942 |
| 2,316,185 | Peterson | Apr. 13, 1943 |
| 2,320,384 | Peterson | June 1, 1943 |
| 2,409,309 | Peterson | Oct. 18, 1946 |
| 2,519,275 | Mollica | Aug. 15, 1950 |
| 2,522,093 | Churchill | Sept. 12, 1950 |
| 2,581,411 | Hendrickson | Jan. 8, 1952 |
| 2,658,315 | Peterson | Nov. 10, 1953 |